(12) United States Patent
Cahoon

(10) Patent No.: US 9,161,665 B2
(45) Date of Patent: Oct. 20, 2015

(54) OUTDOOR SANITATION SEAT

(71) Applicant: Eugene Cahoon, Moreno Valley, CA (US)

(72) Inventor: Eugene Cahoon, Moreno Valley, CA (US)

( * ) Notice: Subject to any disclaimer, the term of this patent is extended or adjusted under 35 U.S.C. 154(b) by 251 days.

(21) Appl. No.: 13/667,265

(22) Filed: Nov. 2, 2012

(65) Prior Publication Data

US 2013/0139310 A1     Jun. 6, 2013

Related U.S. Application Data

(60) Provisional application No. 61/566,618, filed on Dec. 3, 2011.

(51) Int. Cl.
    *A47K 11/02*     (2006.01)

(52) U.S. Cl.
    CPC ........................................ *A47K 11/02* (2013.01)

(58) Field of Classification Search
    CPC ......... A47K 11/00; A47K 11/02; A45B 5/00; A47C 9/10
    USPC ............. 4/449, 460; 297/451.5, 452.2, 451.4, 297/440.13, 440.24; D6/355, 364; 182/63.1, 100, 151, 187; 248/97, 150, 248/165, 188, 351, 451.4

See application file for complete search history.

(56) References Cited

U.S. PATENT DOCUMENTS

| | | | | |
|---|---|---|---|---|
| 690,122 | A * | 12/1901 | Slagle | 248/155 |
| 3,695,702 | A * | 10/1972 | Ingellis | 297/440.24 |
| 4,601,364 | A * | 7/1986 | York | 182/187 |
| 5,083,324 | A * | 1/1992 | Strong | 4/460 |
| 2005/0183193 | A1* | 8/2005 | Karnopp et al. | 4/254 |
| 2007/0108806 | A1* | 5/2007 | Smith | 297/170 |

OTHER PUBLICATIONS

"Sweatproof Swag for Workout Divas and Adrenaline Junkies", Lara Rosenbaum, Women's Health. Dec. 2006, p. 111.*

* cited by examiner

*Primary Examiner* — Paul R Durand
*Assistant Examiner* — Nicholas Ros

(57) ABSTRACT

The present invention is a sanitation seat for assisting urinating and defecating outdoors. The sanitation seat has a top ring comprised of an outer rim around a vacuous region. The outer rim is comprised of at least one "T" coupler and a plurality of curved elements. A leg or legs are detachably connected to the "T" coupler or couplers. If the sanitation seat is to be attached to a tree at least nail passes through the top ring for embedding into a tree, and a tie rope, which beneficially includes a rope attachment, is used to attach the seat to a tree.

12 Claims, 5 Drawing Sheets

OUTDOOR SANITATION SEAT

This application claims priority to U.S. Provisional Application No. 61/566,618, filed on Dec. 3, 2012.

FIELD OF THE INVENTION

The presently disclosed subject matter is directed towards outdoor equipment. More particularly, the principles of the present invention enable portable outdoor sanitation seats for urinating and defecating.

BACKGROUND OF THE INVENTION

America has hundreds of thousands of square miles of outdoor resources such as deserts, scrub land, woodland and forests that are anywhere from easily accessible to extremely difficult to get to. Such outdoor resources are widely used by hikers, campers, rock climbers, bird watchers, fisherman, trail riders, hunters, loggers, prospectors, and many others. Outdoor resource environments range from flat deserts to extremely steep, snow and rock covered mountainous terrain. However, each environment offers its own challenges and pleasures to those who experience them.

Often those who make use of America's outdoor resources must do so in ways such as hiking where portability is extremely important. When hiking, carrying excess weight can dramatically slow a hiker as well as quickly tire them out. Lightweight equipment such as backpacks, sleeping bags, clothing, food, utensils, and other necessities are required.

Deciding what is necessary for a trip to the outdoors is not always easy. If you need something that you did not bring you could be in serious trouble. But, if you bring something you do not need you may end up carrying that item for days. Food, shelter, clothing, water, water purification systems, matches, a compass, and a map are acknowledged as being necessary items. However, no matter what else may happen, a person in the outdoors will eventually have to urinate and defecate.

For males urinating is seldom a problem. But for females it can be. Furthermore defecating outdoors can be uncomfortable for either sex as a suitable sanitation seat is seldom if ever available. Therefore, a light weight portable sanitation seat for urinating and defecating outdoors would be useful. Even more useful would be a light weight portable sanitation seat for urinating and defecating outdoors that is usable in desert and scrub land locations as well as tree covered woodlands and forests.

BRIEF SUMMARY OF THE INVENTION

The principles of the present invention provide for a lightweight portable sanitation seat for urinating and defecating outdoors. Even more useful would be a lightweight portable sanitation seat for urinating and defecating that is usable in desert and scrub land locations as well as tree covered woodlands and forests.

According to a first embodiment of the present invention a sanitation seat has a top ring comprised of an outer rim around a vacuous region. The rim is defined by four equally spaced "T" couplers and four curved sections that are configured such that each "T" coupler connects two curved sections to two other "T" couplers. The first embodiment sanitation seat further includes four detachable legs for extending from the "T" couplers. Beneficially, the first embodiment sanitation seat is comprised of PVC tubing, aluminum, titanium, or thin walled steel.

In an alternative embodiment a sanitation seat has a top ring comprised of an outer rim around a vacuous region. The outer rim is defined by a "T" coupler, two "J" shaped elements that extend from the "T" coupler, two "L" shaped couplers on ends of the "J" shaped elements; and a straight section connected between the two "L" shaped couplers. At least one nail passes through and extends from the straight section. A tie rope passes through the straight section and extends from the two "L" shaped couplers. The nail and tie rope are configured to attach the top ring to a tree.

In different versions of the alternative embodiment front support for the sanitation seat is provided by either a front leg or by part of a walking stick, either of which are beneficially detachably connected to the "T" coupler. The front leg, if used can include a foot. A rope attachment can be included to assist tying of the tie rope to a tree. Preferably, the rope attachment is a "Figure 9" rope attachment. The alternative sanitation seat can be comprised of PVC tubing, a carbon fiber composite, aluminum, titanium or thin walled steel tubing.

BRIEF DESCRIPTION OF THE DRAWINGS

The advantages and features of the present invention will become better understood with reference to the following detailed description and claims when taken in conjunction with the accompanying drawings, in which:

DETAILED DESCRIPTION OF THE INVENTION

The presently disclosed subject matter now will be described more fully hereinafter with reference to the accompanying drawings in which one embodiment is shown. However, it should be understood that this invention may take many different forms and thus should not be construed as being limited to the embodiment set forth herein.

In the figures, like numbers refer to like elements throughout. Additionally, the terms "a" and "an" as used herein do not denote a limitation of quantity, but rather denote the presence of at least one of the referenced items.

The principles of the present invention are explained herein with reference to FIGS. 1 to 5. Specifically, the principles of the present invention provide for lightweight portable sanitation seats for urinating and defecating outdoors. Various embodiments of the present invention can be used in treeless environments as well as in treed environments.

Figure 1:
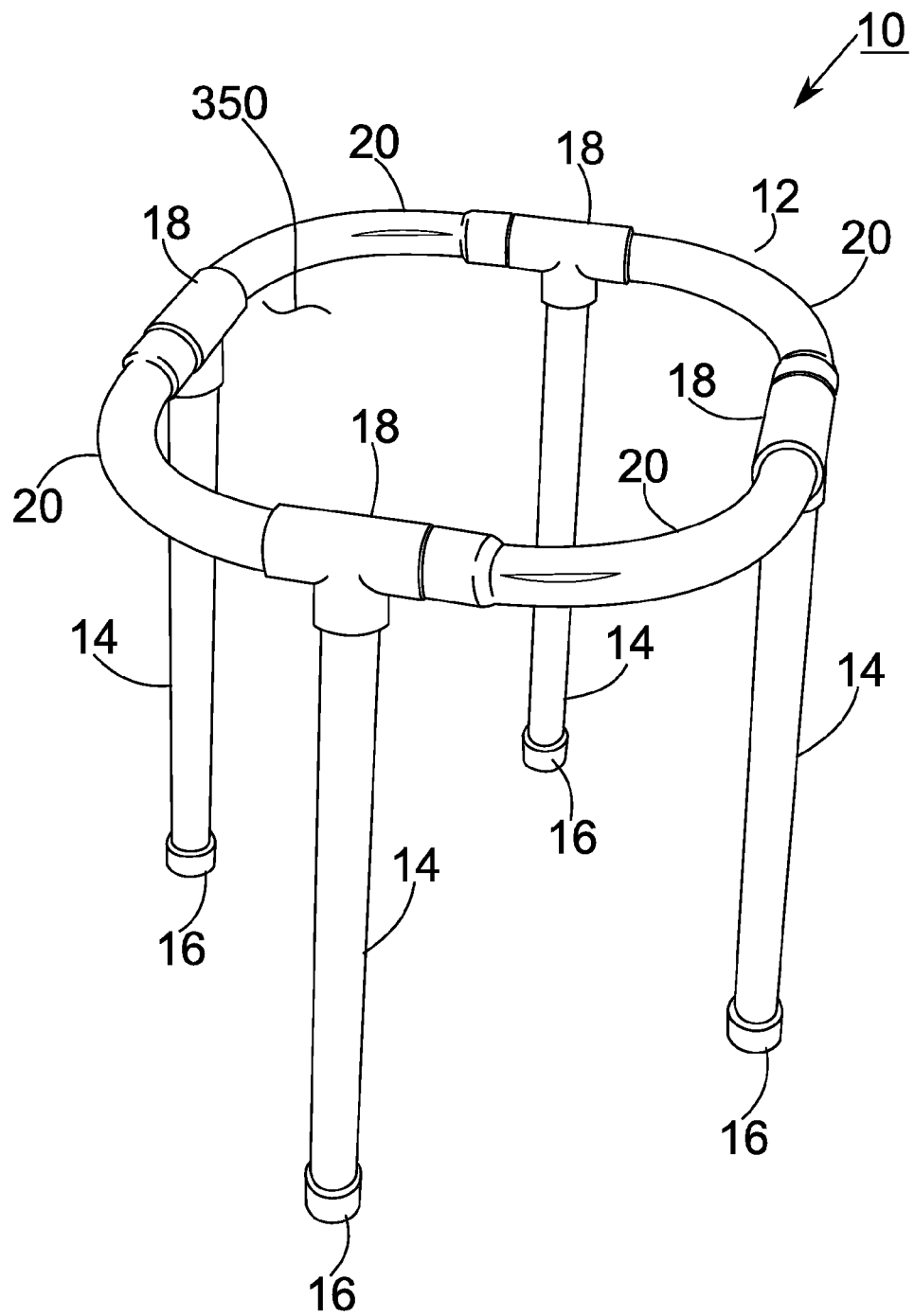
FIG. 1 a perspective view of an assembled first embodiment sanitation seat 10 for urinating and defecating outdoors.

FIG. 1 illustrates a first embodiment sanitation seat 10. The first embodiment sanitation seat 10 is comprised of a top ring 12 and four (4) legs 14, each of which ends in a leg cap 16. The top ring 12 has an outer rim defined by four (4) equally spaced "T" couplers 18 and four (4) curved sections 20. That rim surrounds a vacuous region 350. Each "T" coupler 18 connects two (2) of the curved sections 20 to other T" couplers 18 and to one (1) leg 14 together so as to form the first embodiment sanitation seat 10. Inside the outer rim the top ring 12 is void.

Figure 2:
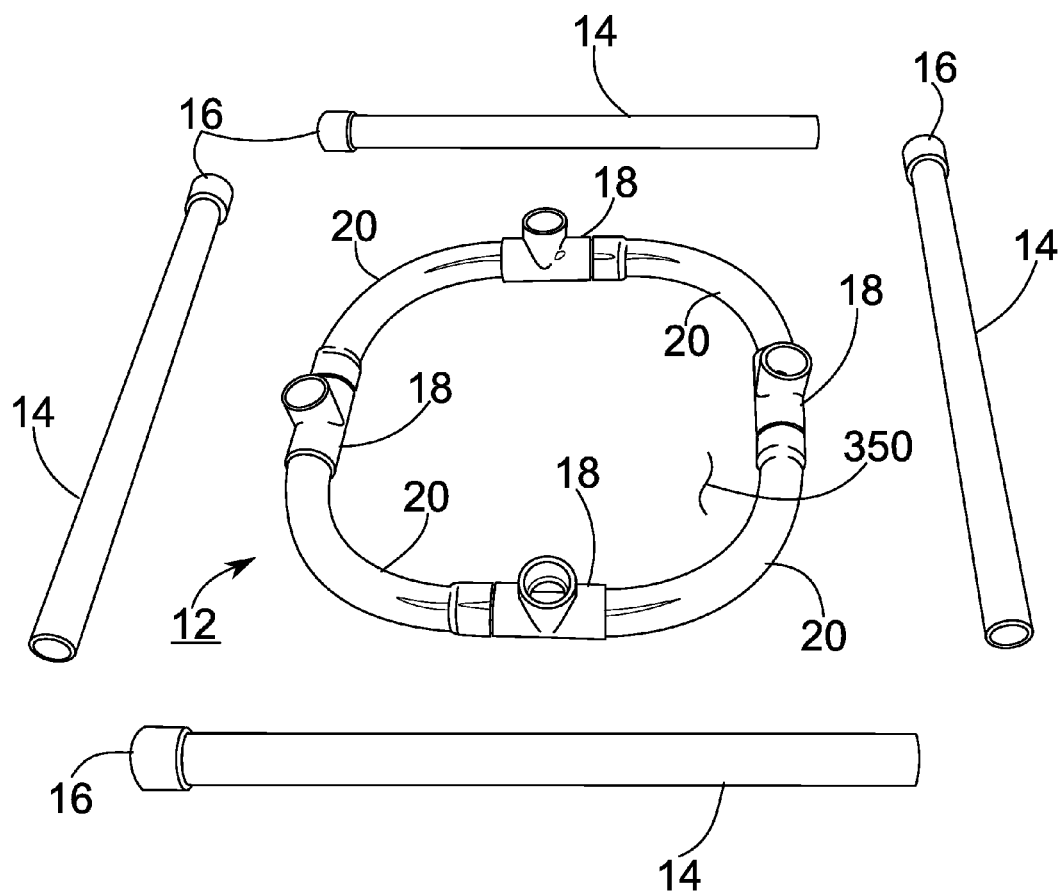
FIG. 2 illustrates the components of the first embodiment sanitation seat 10 depicted in FIG. 1.

FIG. 2 illustrates the various components of the first embodiment sanitation seat 10. Beneficially the legs 14 with their leg caps 16 are removable from the top ring 12. However, the top ring 12 forms an integral body comprised of the "T" couplers 18 and curved sections 20 and the vacuous region 350. The sanitation seat 10 can form a stable sanitation seat for urinating or defecating. When not in use the legs 14 can be removed from the top ring 12 to assist carrying, packing, and storing.

The sanitation seat 10 is beneficially very lightweight, preferably around 2 pounds or less. It can be comprised of PVC tubing, or for extra strength from a carbon fiber composite or from a strong lightweight metal such as aluminum T6061, a titanium alloy, or from thin-walled, structurally reinforced steel.

While the first embodiment sanitation seat 10 is very useful, in forested or heavily treed locations a sanitation seat that attaches to a tree might prove more useful. Turn now to FIG. 3 where the components of a second embodiment sanitation seat 200 are illustrated. The second embodiment sanitation seat 200 includes a top ring 201 that forms an outer rim around a vacuous region 350. The outer rim is comprised of an angled "T" coupler 202; two "J" shaped curved elements 204 that extend from the "T" coupler 202; two "L" shaped couplers 206; and a straight section 208. The two "L" shaped couplers 206 are used to connect the straight section 208 to the two "J" shaped curved elements 204. The various elements are configured such that the ring 201 forms a continuous "U" shaped harness.

In addition to the outer rim formed by the various components the second embodiment sanitation seat 200 includes two nails 210 that pass through the straight section 208 and a tie rope 212 that passes into the two "L" shaped couplers 206 and through the straight section 208. The second embodiment sanitation seat 200 also includes a front leg 220 having a foot 223.

For ease of use the tie rope 212 beneficially includes a rope attachment 214. Preferably that rope attachment 214 is a product produced by NITE IZE™ and is referenced to as a "Figure 9" rope attachment. That rope attachment is highly useful as it enables simple tightening, tensioning, and securing of the second embodiment sanitation seat 200 to a tree 400 (see FIG. 5) using the tie rope 212.

Figure 3:
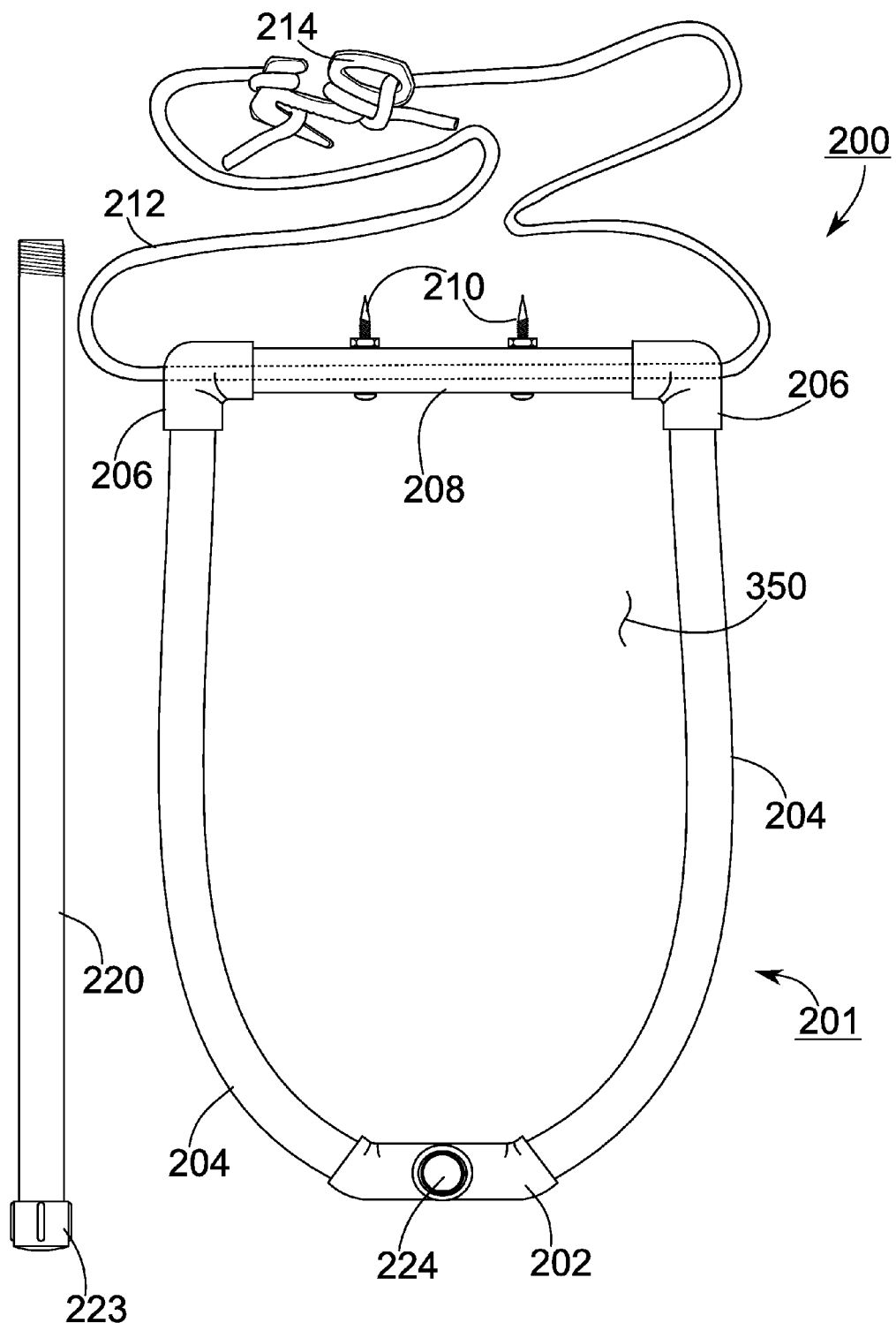
FIG. 3 illustrates the components of a second embodiment sanitation seat 200.
Figure 5:
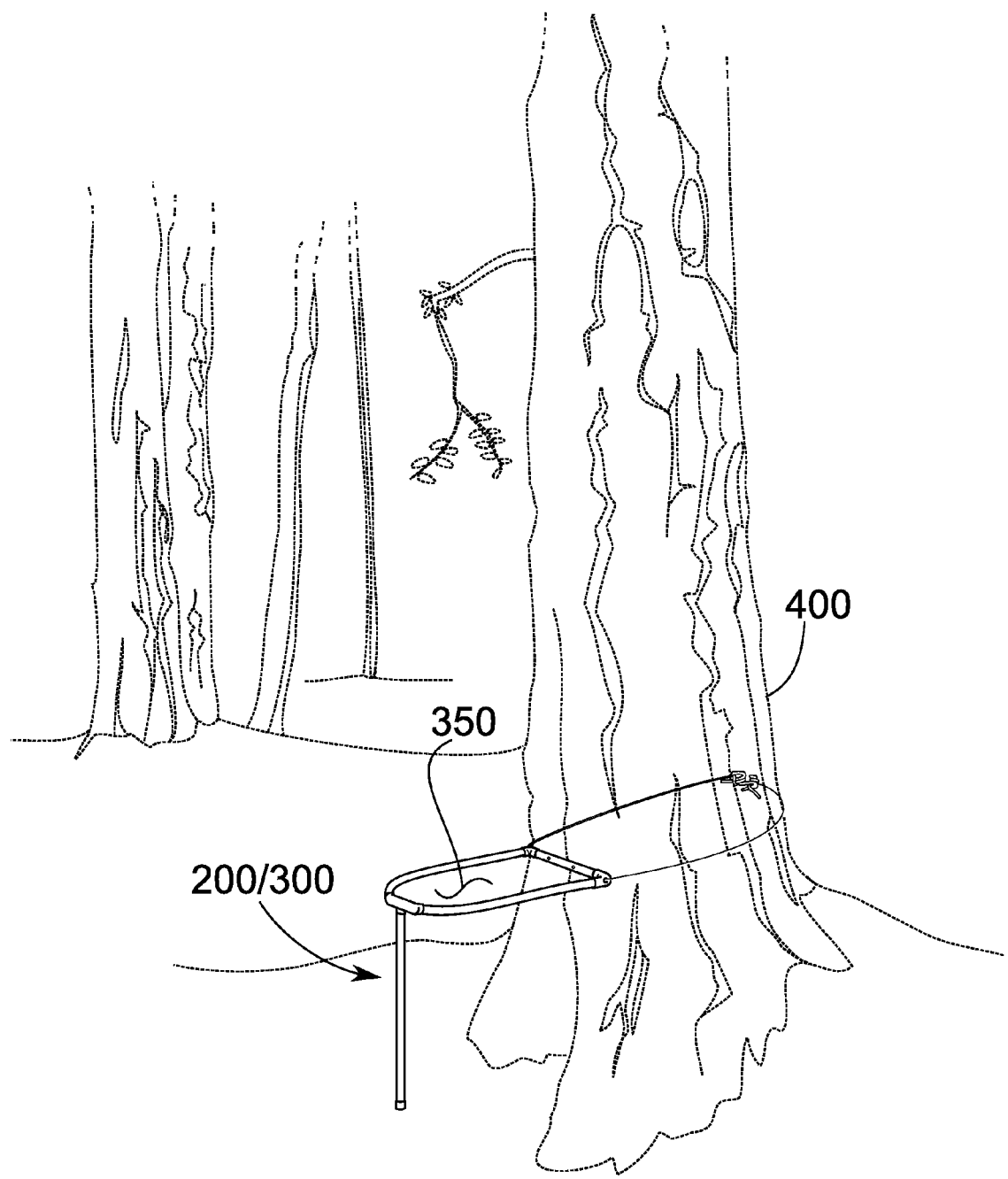
FIG. 5 illustrates a sanitation seat, such as the second embodiment sanitation seat 200 or the third embodiment sanitation seat 300, connected to a tree 400.

Referring now to FIGS. 3 and 5, in use, the end of the front leg 220 opposite the foot 223 is inserted into an opening 224 of the "T" coupler 202. The second embodiment sanitation seat 200 is then placed against a tree 400 such that the nails 210 enter the tree 400. The tie rope 212 is then wrapped around the tree 400 and tightly cinched tight using the rope attachment 214. The result is a seat with a vacuous region 350 as shown in FIG. 5.

Figure 4:
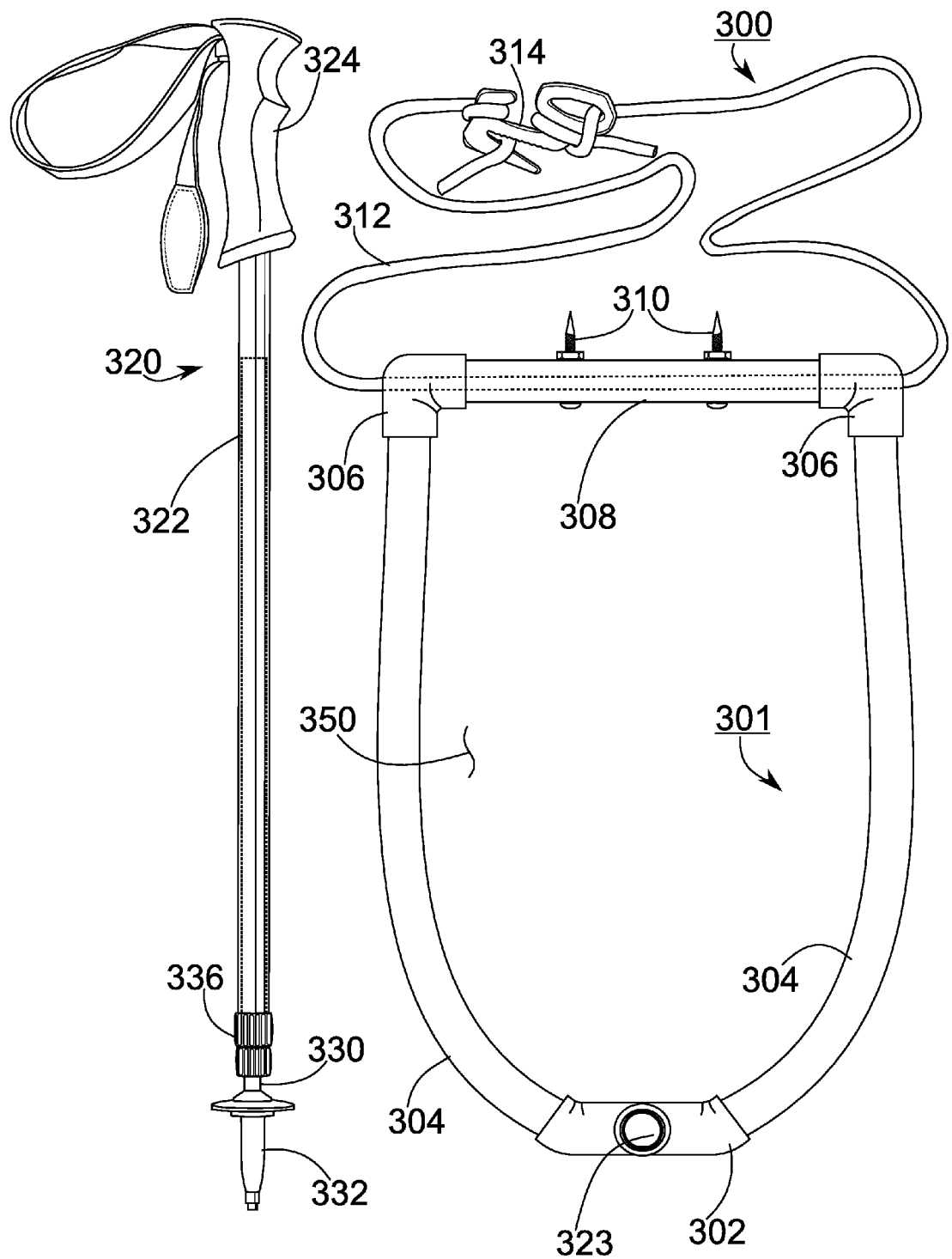
FIG. 4 illustrates the components of a third embodiment sanitation seat 300.

While the second embodiment sanitation seat 200 is very useful in some areas it may not be optimal for all outdoorsman. For example, hikers in particular are very weight and bulk conscience. Furthermore, many hikers use a highly configurable walking stick. FIG. 4 illustrates a third embodiment sanitation seat 300 having a top ring 301 that forms an outer rim around a vacuous region 350. The outer rim is comprised of an angled "T" coupler 302; two "J" shaped curved elements 304 that extend from the "T" coupler 302; two "L" shaped couplers 306; and a straight section 308. The two "L" shaped couplers 206 are used to connect the straight section 308 to the two "J" shaped curved elements 304. The various elements are configured such that the ring 301 becomes a continuous "U" shaped harness that defines a vacuous region 350.

In addition, two fixed nails 310 pass through the straight section 308 and a tie rope 312 passes into the two "L" shaped couplers 306 and through the straight section 308. Similar to the second embodiment sanitation seat 200 the tie rope 312 includes a rope attachment 314, preferably the one produced by NITE IZE™ and referred to as a "Figure 9" rope attachment.

The third embodiment sanitation seat 300 uses a hiking stick 320 as a front leg. The hiking stick 320 is comprised of an outer top element 322 having handle 324 and an inner element 330 that includes an external pointed end 332. The inner element 330 is retained inside the outer top element 322 by a locking system 336. The locking system 336 can be loosened to allow the inner element 330 to separate from the outer top element 322.

Referring now to FIGS. 4 and 5, in use, the locking system 336 is loosened and the inner element 330 is separated from the outer top element 322. The end of the inner element 330 opposite the external pointed end 332 is inserted into an opening 323 of the "T" coupler 302. Referring now to FIG. 5, the third embodiment sanitation seat 300 is then placed against a tree 400 such that the nails 310 enter that tree 400. The tie rope 312 is then wrapped around the tree 400 and cinched tight using the rope attachment 314. The result is a seat having the vacuous region 350 as shown in FIG. 5.

Like the first embodiment sanitation seat 10, the second sanitation seat 200 and the ring 301 of the third sanitation seat 300 are beneficially very lightweight, preferably 12 ounces or less, and are comprised of PVC tubing, a carbon fiber composite, an aluminum such as T6061, a titanium alloy, or of a thin-walled, structurally reinforced steel.

It is to be understood that while the figures and the above description illustrate the present invention, they are exemplary only. They are not intended to be exhaustive or to limit the invention to the precise forms disclosed, and obviously many modifications and variations are possible in light of the above teaching. Others who are skilled in the applicable arts will recognize numerous modifications and adaptations of the illustrated embodiments that remain within the principles of the present invention. Therefore, the present invention is to be limited only by the appended claims.

What is claimed:

1. A sanitation seat, comprising:
   a top ring having an outer rim around a vacuous region, said outer rim comprised of a "T" coupler, two "J" shaped elements that extend from said "T" coupler, two "L" shaped couplers on ends of said "J" shaped curved elements; and a straight section connected between said two "L" shaped couplers;
   at least one nail that passes through and extends from said straight section; and
   a tie rope that passes through said straight section and extends from said two "L" shaped couplers;
   wherein said nail and said tie rope are configured to attach said top ring to a tree.

2. A sanitation seat according to claim 1, further including a front leg detachably connected to said "T" coupler.

3. A sanitation seat according to claim 2, wherein said front leg includes a foot.

4. The sanitation seat according to claim 2, wherein said front leg is a stick.

5. The sanitation seat according to claim 4, wherein said stick is a walking stick.

6. A sanitation seat according to claim 2, further including a rope attachment for assisting tying said tie rope to a tree.

7. The sanitation seat according to claim 2, wherein said top ring is comprised of PVC tubing.

8. The sanitation seat according to claim 2, wherein said top ring is comprised of a carbon fiber composite.

9. The sanitation seat according to claim 2, wherein said top ring is comprised of aluminum.

10. The sanitation seat according to claim 2, wherein said top ring is comprised of titanium.

11. The sanitation seat according to claim 2, wherein said top ring is comprised of thin walled steel tubing.

12. The sanitation seat according to claim 1, wherein said "T" coupler includes an opening for receiving an end of a walking stick.

* * * * *